T. F. WILSON.
CRANK RETAINING DEVICE.
APPLICATION FILED JUNE 13, 1914.
1,118,167.
Patented Nov. 24, 1914.
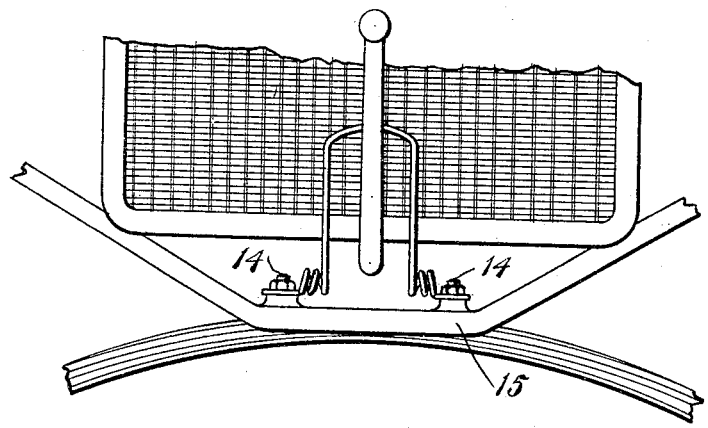
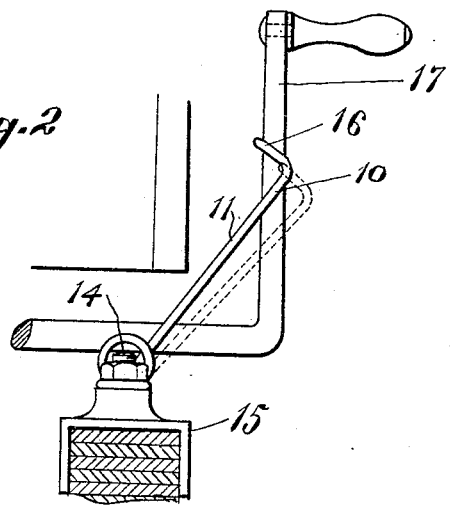
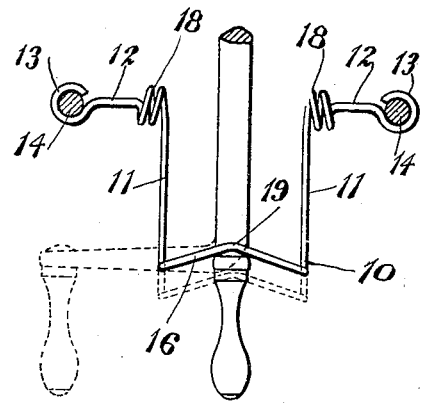
Inventor
Thomas F. Wilson
Witnesses
Augustus F. Friend
A. F. Macready.
By
Howard E. Barlow
Attorney

UNITED STATES PATENT OFFICE.

THOMAS FORD WILSON, OF CRANSTON, RHODE ISLAND.

CRANK-RETAINING DEVICE.

1,118,167.  Specification of Letters Patent.  Patented Nov. 24, 1914.

Application filed June 13, 1914. Serial No. 845,004.

*To all whom it may concern:*

Be it known that I, THOMAS F. WILSON, a citizen of the United States, and resident of the city of Cranston, in the county of Providence and State of Rhode Island, have invented certain new and useful Improvements in Crank-Retaining Devices, of which the following is a specification.

This invention relates to retaining devices for crank handles and has for its object to provide a member or arm to engage and releasably retain the starting crank handle for automobiles and the like by spring pressure.

A further object of the invention is to construct the retaining arm of wire having its ends adapted to be secured to the vehicle frame and its upper portion extending at an acute angle to the axis of the horizontal portion of the crank when in operative position and into the path of rotation of the crank handle, whereby the rotation of the crank handle raises and automatically positions the spring arm to releasably engage and retain the crank handle by the inherent spring in the arm.

With these and other objects in view, the invention consists of certain novel features of construction, as will be more fully described and particularly pointed out in the appended claims.

In the accompanying drawings: Figure 1—is a front elevation of my improved retaining arm as attached to a car and as engaging and releasably retaining the crank handle in upright position. Fig. 2—is a side elevation showing the spring arm in full lines in engagement with the crank handle, and in dotted lines as moved forward in its inoperative position, which position it takes when not in engagement with the crank handle. Fig. 3—is a plan view showing the retaining device as formed of wire bent substantially into a U shape with its legs fixed to the body portion and its free end in engagement with the crank handle, the dotted lines showing the arm in inoperative position and as extending into the path of rotation of the crank handle, the latter being illustrated in dotted lines.

Referring to the drawings 10 designates my improved retaining arm which is preferably formed of one single piece of wire bent substantially into a U shape, the lower ends of the legs 11 being turned outward as at 12, see Fig. 3, and provided with eyes 13 to engage bolts 14 on the frame 15 of the vehicle. The bridge portion 16 of the U shaped member, is preferably bent slightly backward from the axis of the legs forming a slight recessed portion adapted to press against the back of the crank handle 17 and releasably retain the same in upright position.

In order to provide an easy raising movement of this presser arm, I have provided a coil 18 in each of the laterally extending end portions, whereby a greater range of action and ease of movement of said arm is obtained. The spring tension of this arm is so arranged that when the crank handle has been withdrawn from the recessed portion 19, the arm will extend forward into the path of rotation of the crank handle and set at an acute angle to the axis of its horizontal portion, whereby when the handle is rotated it engages the underside of the arm and automatically raises it permitting the crank to pass by without independent manipulation of the arm, and the recessed portion 19 in this arm is just deep enough to engage and retain the crank handle normally in upright position under the inherent spring in the stock, but the angle of this bridge portion is such that it will release the crank when pressure is applied by the hand of the operator without requiring extra manipulation of the spring arm on his part, to permit the crank to be rotated.

The device is extremely simple and inexpensive in its construction and yet practical and efficient in its operation. It is preferably constructed of a single piece of wire, is automatic in its action and by its use an efficient and effective retaining device is provided at the minimum expense for holding the crank handle of an automobile.

I claim:

1. A retaining arm for crank handles constructed of resilient material and adapted to be connected firmly at one end to the vehicle frame, the opposite end being adapted to engage and releasably retain the crank by spring pressure, said arm when in inoperative position being adapted to lie at an acute angle to the horizontal axis of the crank and in the path of rotation of the crank, whereby said arm is automatically raised by the rotation of the crank to permit the latter to pass.

2. A retaining arm for crank handles constructed of resilient wire and having one end adapted to be firmly connected to the vehicle frame, the free end of said arm being bent back out of line of the axis of the arm to releasably engage the handle and press against the same by the inherent spring in the wire, said arm when in inoperative position being adapted to lie at an acute angle to the horizontal axis of the crank and in the path of rotation of the crank whereby said arm is automatically raised by the rotation of the crank to permit the latter to pass.

3. A retaining arm for crank handles constructed of one continuous piece of resilient wire bent substantially into a U shape, the legs of the U being bent to be rigidly connected to the vehicle, the bridge portion of said U being bent to engage the crank and press the same outward by the inherent spring pressure of the stock, said arm when in inoperative position being adapted to lie at an acute angle to the horizontal axis of the crank and in the path of rotation of the crank whereby said arm is automatically raised by the rotation of the crank to permit the latter to pass.

In testimony whereof I affix my signature in presence of two witnesses.

THOMAS FORD WILSON.

Witnesses:
  HOWARD E. BARLOW,
  A. F. MACREADY.

Copies of this patent may be obtained for five cents each, by addressing the "Commissioner of Patents. Washington, D. C."